May 17, 1960  R. D. RODD  2,936,719
DIAL SET AUTOMATIC TOW LINE TRUCK RELEASE
Filed Aug. 15, 1957  3 Sheets-Sheet 1

INVENTOR
Raymond D. Rodd
BY
Frank H. Borden
ATTORNEY

May 17, 1960 R. D. RODD 2,936,719
DIAL SET AUTOMATIC TOW LINE TRUCK RELEASE
Filed Aug. 15, 1957 3 Sheets-Sheet 2
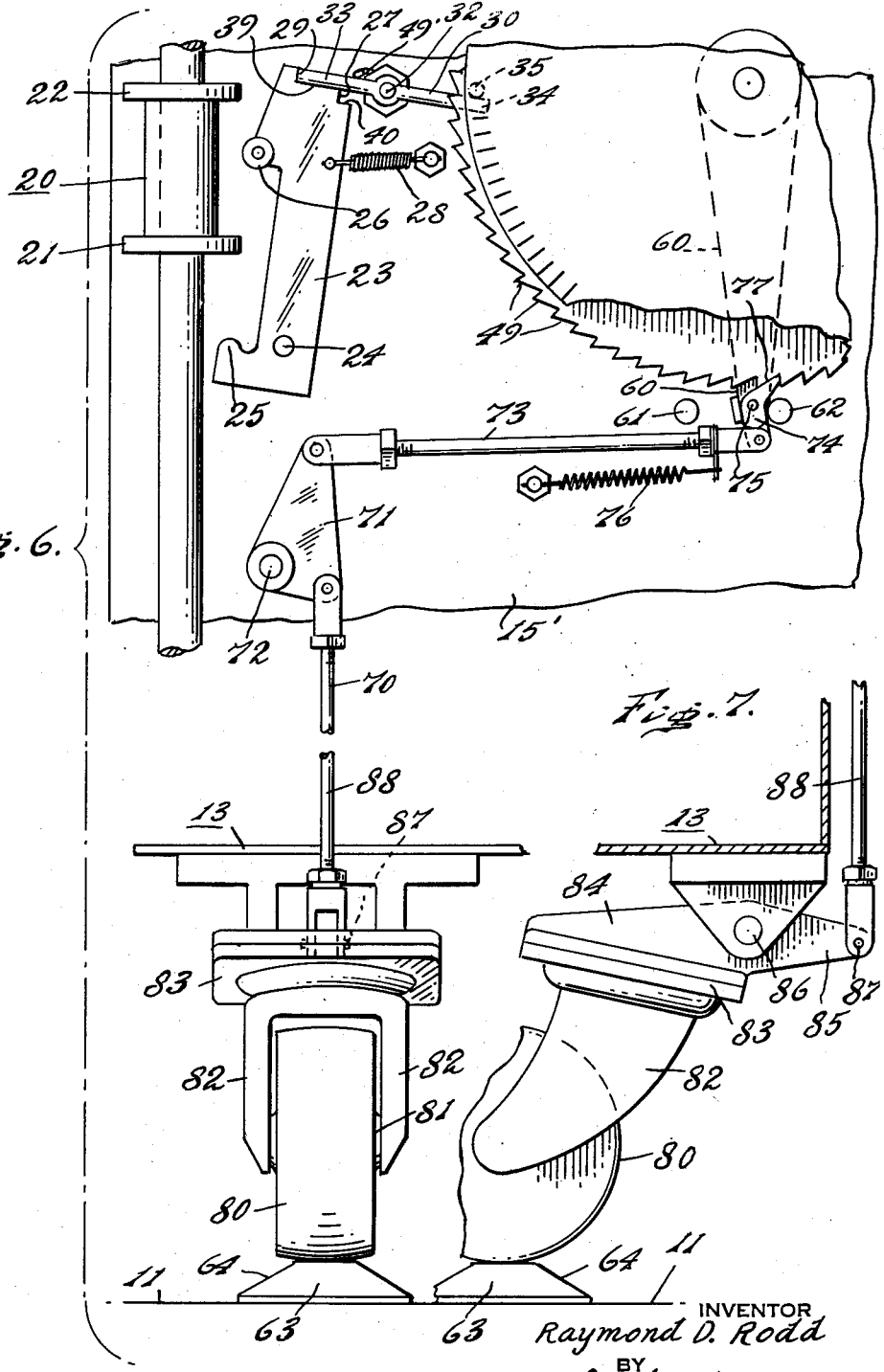
INVENTOR
Raymond D. Rodd
BY
Frank H. Borden
ATTORNEY

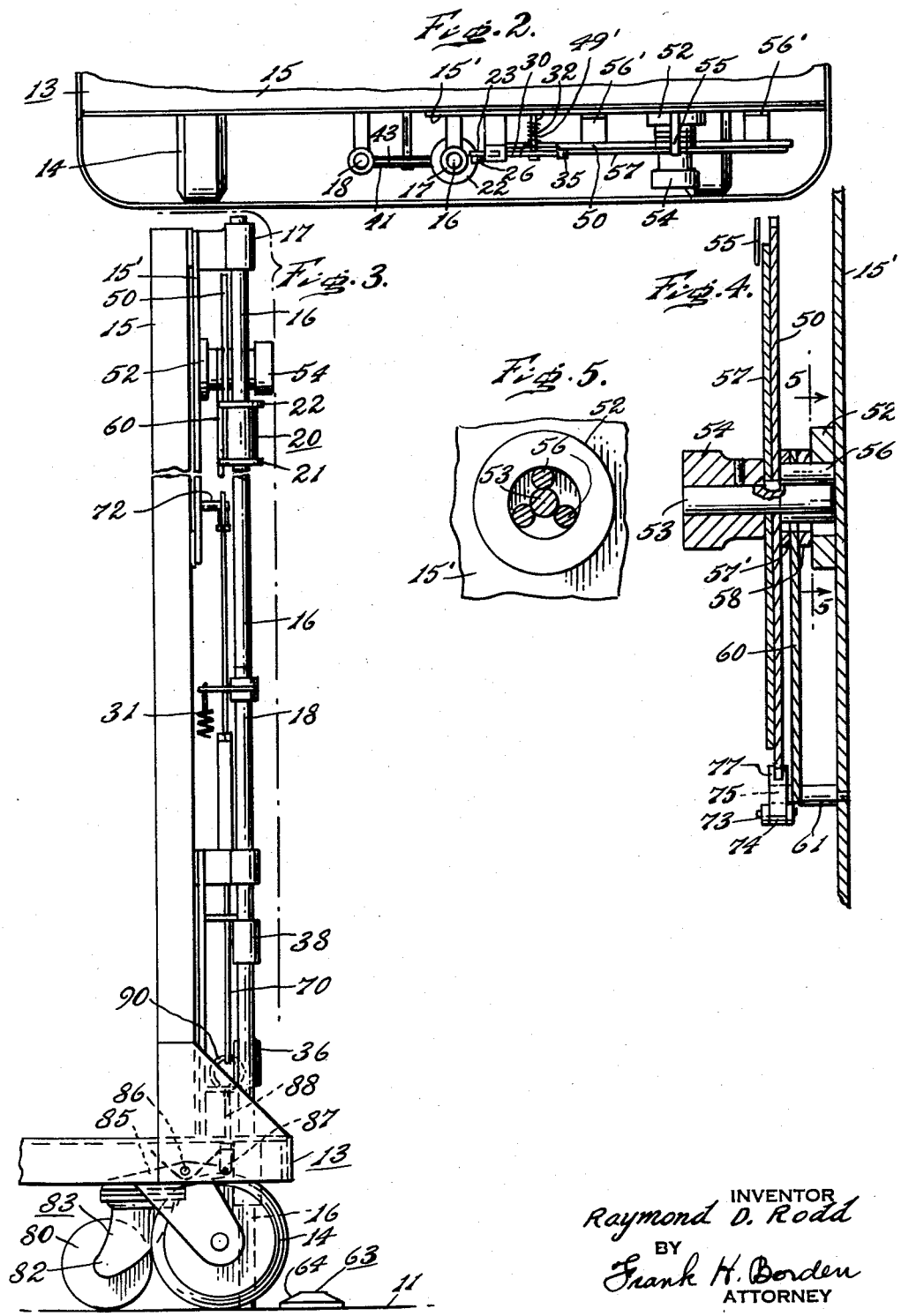

United States Patent Office 2,936,719
Patented May 17, 1960

2,936,719

DIAL SET AUTOMATIC TOW LINE TRUCK RELEASE

Raymond D. Rodd, Rutland, Vt., assignor, by mesne assignments, to S I Handling Systems, Inc., Easton, Pa., a corporation of Pennsylvania Application August 15, 1957, Serial No. 678,312

15 Claims. (Cl. 104—172)

This invention relates to a dial set automatic tow line truck release.

In an application of Bradt and Stewart filed May 29, 1957, Serial No. 662,379, there was disclosed an important advance in automatic tow line truck release apparatus. This established the automatic release of a towed truck at a pre-selected station on the terminal floor. It also incorporates various important subsidiary features of advantage in terminal floor truck service. As disclosed the mechanism is rather elaborate, using precoded signals on the truck for response only to complemental precoded signals above the truck. While perfectly satisfactory it has a certain lack of elasticity in the ability to effect quick changes in the particular unloading area desired for a given truck.

It is among the objects of this invention; to improve the construction of tow trucks for terminal systems; to provide a tow-pin release gear for tow trucks, of simplicity; to provide a tow truck with release gear operated as a function of a predetermined number of pulses or impulses derived from signal elements on the floor of the terminal; to provide a tow pin release gear operated functionally with the distance traversed by the instant truck; to provide a terminal floor having a main tow pin guiding slot, with a plurality of substantially identical shallow signal abutments in alignment beside the slot, with a truck mounting a releasable tow pin disposed in said slot, and a sensing device responding to contact of successive signal abutments in the towed course of the truck, with means for establishing or changing the number of successive contacts by which automatically the tow pin is released from the slot; to provide a truck with a movable tow pin, tow pin release gear, and dial set means for predetermining the distance the truck is towed until the release gear is actuated; to provide a truck with a tow pin, a ratchet and pawl organization with means for advancing the ratchet one step each time the truck passes over an abutment of a series of abutments, with means for elevating the tow pin when the ratchet attains a datum; and many other objects and advantages will become more apparent as the description proceeds.

In the accompanying drawings forming part of this description:

Fig. 1 represents a front elevation of a truck, showing the tow pin release gear, and a fragmentary section of the terminal floor showing the main and shunt slot therein with the main tow pin disposed in the main slot, with a sensing device beneath the truck in position to engage and to react from a signal abutment on the floor, with the truck towed toward the signal abutment, with the main tow pin latched down and with the pawl element in its retracted position which it assumes between sensed impulses.

Figs. 2 and 3 represent respectively fragmentary top plan and side elevations of the front end of the truck, with some elements omitted or broken away for clarity.

Fig. 4 represents a fragmentary vertical section through the ratchet gear wheel assembly showing the manual setting control knob and the dial overlying the ratchet wheel unit.

Fig. 5 represents a fragmentary vertical section taken on line 5—5 of Fig. 4.

Figure 1:
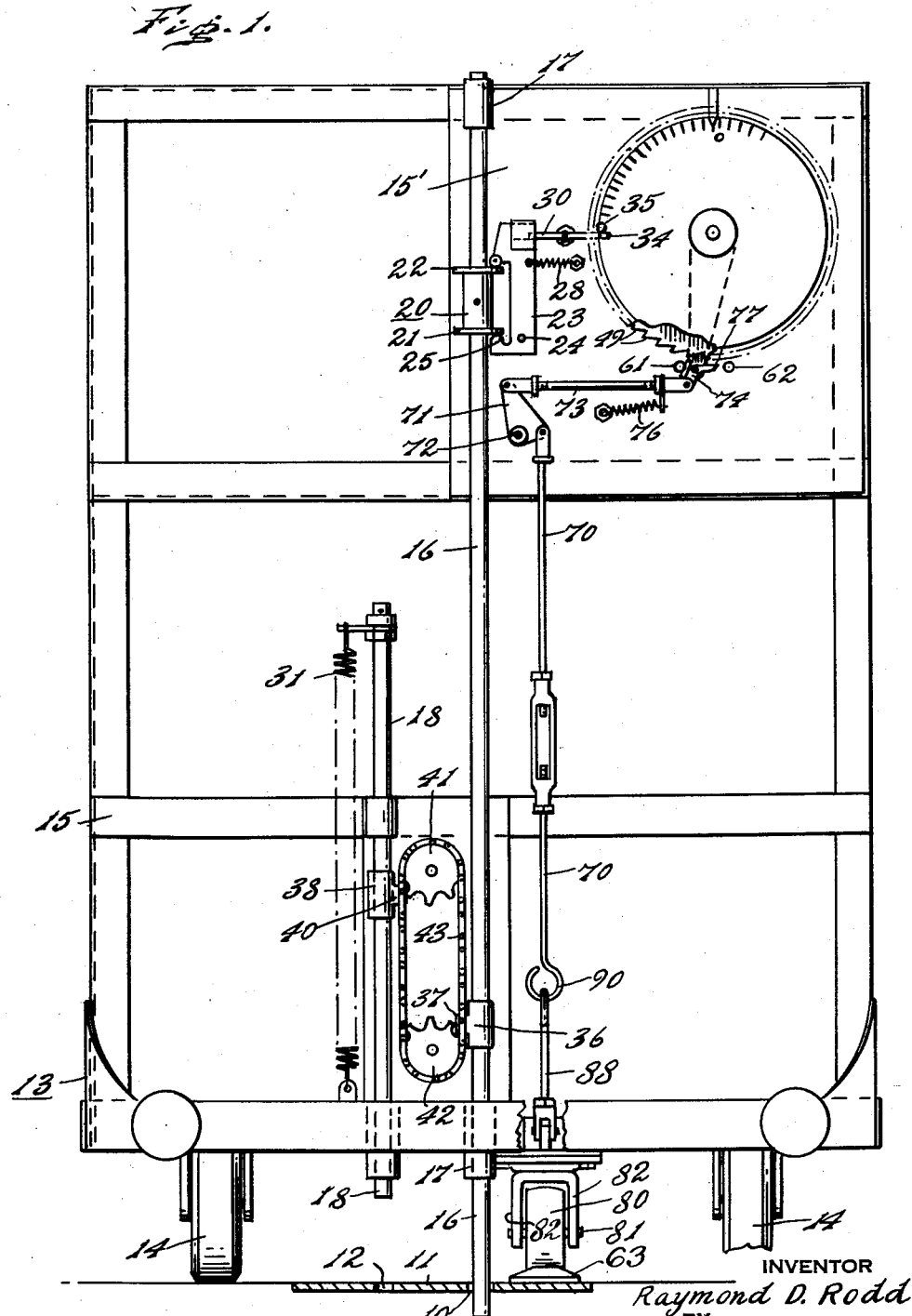

Fig. 6 represents a fragmentary enlarged elevation of the tow pin operating gear assembly and its actuating linkage, partially broken away, and showing the floor signal sensing element at its peak of actuation on and by an instant signal on the floor, with the pawl and ratchet organization at the completion of its movement in advancing the ratchet wheel, and with the latching element released and the main tow pin in its raised attitude to which it has been biased upon unlatching.

Fig. 7 represents a fragmentary side elevation of the signal sensing unit of the truck in the attitude attained in Fig. 6.

In carrying out the invention in an illustrative embodiment, the terminal floor 11, containing at least main or primary drag-line slot 10, is provided with an aligned series of identical abutment elements 63, so disposed on the floor as to be successively engaged by an abutment impulse-responsive element on each truck. Generally as noted each abutment 63 is similar to each other abutment and comprises a central element of maximum thickness toward the center, merging into lateral sloping surfaces 64, and of such minimal vertical extent as to permit free manual or automatic motion of any un-towed truck in any direction across said terminal floor, without appreciable interference with the supporting wheels thereof.

Assume a large number of tow trucks 13 respectively, which may in number be of such order as to cooperate with unloading stations or "doors" of the order of one hundred or more. In the usual and preferred installation the terminal floor 11 is provided with an endless main slot 10, and also a multiplicity of shunt or spur slots 12, with one or more trucks for each station, and the shunt slots may be in communication with main slot 10 or out of slot communication therewith. Usually there are one or more shunt slots for each unloading station, door, or area. It is desired to have each truck 13 provided with a tow pin to be described, which latter is selectively actuated to pass vertically downwardly through the main slot 10 into engaged towed relation with a conveyor system in the floor below the floor slot 10, so that each truck is towed across the terminal floor following the primary slot 10. At a preselected station, usually a truck unloading station or area, the tow pin of an instant truck is to be withdrawn automatically, vertically out of the conveyor system, while still remaining in the main slot 10, in some cases when desired, or, in the embodiment disclosed, withdrawn from the main slot 10 as well as from the conveyor. In the event shunt slots 12 are provided, it is preferred that the withdrawal of the main tow pin from slot 10 be accompanied by entrance of an auxiliary tow pin into the instant shunt slot 12.

The truck 13, of conventional load-supporting and transporting body construction, has, preferably, four castering supporting wheels 14, and at the front mounts a rigid frame 15. A primary or main tow pin 16 is slidably guided for vertical reciprocation in bushings 17 on the frame 15. Tow pin 16 is suitably biased upwardly as will be described, so that when unlatched by means to be described, it snaps upwardly in the bushings, so as to retract the lower end of the pin from the conveyor (not shown but disposed in alignment with and below main slot 10 in the floor 11) and, in the preferred form, retracting the tow pin 16 from the main slot 10. Of course, as noted, if desired the retraction of the tow pin may be from the conveyor only, while still remaining in the main slot 10.

For purposes of latching and unlatching the tow pin a flanged spool 20, having a lower flange 21 and an upper flange 22, is pinned to the tow rod. A latch lever 23 is pivoted to the sub frame 15' at 24, and mounts on its forward surface an upwardly presenting toe 25, engageable under lower flange 21. The lever also mounts on the forward surface a downwardly presenting detent roller 26 for engaging over or for moving out of the vertical path of movement of the upper flange 22, of the latching spool 20. A bias is provided urging the latch lever 23 in a clockwise direction. Illustratively this comprises a tension spring 28.

Mention has been made of the bias urging tow pin 16 upwardly. Obviously this may comprise a spring device of any sort extending between frame 15 and the tow pin 16. It may comprise the biasing organization of said application. Illustratively, the bias is provided through the linkage connecting the primary tow pin 16 and the complemental or auxiliary tow pin 18. The latter is disposed for vertical sliding in guides on the frame 15, in parallel relation to primary tow pin 16, in such spaced relation as to move downwardly into a shunt slot 12, for guiding relation therein, leading to a desired area, as the primary tow pin 16 moves vertically out of main slot 10. The auxiliary tow pin 18 is connected at its upper end to a tension spring 31, connected to the frame 15, biasing the auxiliary tow pin 18 downwardly. A fitting 36 is mounted on tow pin 16 and includes a lug 37. A fitting 38 is mounted on auxiliary tow pin 18, and includes a lug 40. Upper and lower chain pulleys 41 and 42 are journalled on parallel horizontal vertically aligned pins, mounted on frame 15, and a linked chain, or cable or the like 43, is anchored to the respective lugs 37 and 40, and passes about the pulleys 41 and 42, so that a movement of tow pin 16 in one vertical direction, is necessarily accompanied by a movement of the auxiliary tow pin 18 in the other vertical direction. The bias of spring 31, urging auxiliary tow pin 18 downwardly, thus is translated into a bias urging primary tow pin 16 upwardly. Relatedly, a downward push on tow pin 16 toward latching, and toward entry into slot 10 and into engagement with the conveyor, is accompanied by a vertical retraction of auxiliary tow pin 18, clear of the floor 11. Upon unlatching and vertical rising of main tow pin 16, the auxiliary tow pin 18 is forced downwardly into shunt slot 12.

At its upper end the latch lever 23 is provided with two parallel spaced rearwardly presenting detent faces at different levels, respectively stop face 27 and latch face 29, connected by generally horizontal guide surface 39. Stop face 27 at its lower end merges into a transverse generally horizontal lever stop surface 40.

A transverse lever 30 is provided, which is pivoted, at pin 32, to the sub frame 15'. The lever is biased about its axis in a counter clockwise direction so that its latching abutment end 33 abuts transversely against either, the lever stop surface 40, with the end 33 of the lever engaged behind detent surface 27, to hold the latch lever 23 in its latched forward position, or engages against and is guided by guide surface 39 to engagement against detent surface 29, to limit the clockwise movement of the latch lever. The bias on transverse lever 30 may be gravitational if desired, but is preferably by a spring of conventional organization, usually associated with the pivot pin 32 as shown at 49'.

The transverse lever 30 has an actuating end 34 disposed in the path of movement of an impulse-progressed trip member 35 mounted on a pawl-responsive ratchet wheel 50, to be described.

It will be understood that in the forward latched position of the latch lever 23, with the latter in general parallelism with tow pin 16, the latter is held against vertical motion in both directions. In this attitude the abutment end 33 of lever 30 bears laterally against lever stop surface 40 and the end thereof engages behind detent face 27, holding the latch lever latched against the bias of spring 28.

When the rear actuating end 34 of lever 30 is engaged and actuated by trip member 35, the lever 30 is moved about its axis on pin 32, elevating the front abutment end 33 from behind detent face 27, permitting the latch lever 23 to respond to the force of bias 28, to move clockwise about its axis 24. As, at this juncture the abutment end 33 of the transverse lever 30 is in line with the detent face 29 of the latch lever, the clockwise motion of the lever is stopped and limited by the impingement of face 29 against the end 33 of the lever.

With the unlatching of the latch lever, functional, as will be explained, with attachment by the instant truck of the predetermined area at which the truck is to be disengaged from the towing conveyor, the roller detent 26 is withdrawn from its position overlying upper flange 22, as the toe 25 rises under flange 21, initiating upward motion of the tow pin 16, synchronously with and completed by, the upward bias on the tow pin.

With the attendant release of the tow pin from the conveyor, and with disengagement of the tow pin 16 from slot 10, and entrance of the auxiliary tow pin 18 into shunt slot 12, the truck is in a position to be guided on the floor onto the designated unloading area, spaced from the main slot 10. The movement of the instant truck onto the area to which it is guided by shunt or spur slot 12, may be manual, may be initiated by a bump from a succeeding truck, or it may be a towed relation secured by having the auxiliary tow pin 18 pass through the shunt slot 12 and into engagement with a secondary conveyor, not shown. At any rate, in due course the instant truck is partially or wholly unloaded, and it is then ready to be returned to the floor for engagement of the main tow pin 16 with the main slot 10, for towed engagement by the conveyor, for ultimate passage onto another unloading area, or for return to the main loading area of the terminal floor.

By the organization to be described, in due course the impulse mechanism is re-set for the desired tow pin unlatching predetermination, which moves the ratchet wheel 50 and thus removes the pressure of the trip member 35 from the free end 34 of the transverse lever, and permits the latter to respond to its bias about the axis of the pin 32 and urges the abutment end 33 of the lever downwardly against the guide surface 39, while retaining its abutting against the face 29 to hold the latch lever at the limit of its clockwise motion.

When the instant truck is repositioned on the floor for again starting on its towed course with the conveyor in the slot 10, manual force is applied downwardly on the main tow pin 16, against the bias effective thereon, to force the lower end of the main or primary tow pin 16 into slot 10 and into engaged relation with the conveyor aligned therewith. Synchronously with this downward motion of the main tow pin, the flange 21 of the spool 20 engages lever toe 25, forcing latch lever 23 counterclockwise, and bringing detent roller 26 over and into substantial engagement with the upper flange 22 of the spool. As the latch lever moves counterclockwise on its pivot 24, the abutment end 33 of the transverse lever, under the influence of the lever bias bears downwardly against the guide surface 39, and with continued counter-clockwise motion of the latch lever the guide surface moves out from under the lever end, and when the latch lever has attained its full latching position the abutment end of the transverse lever snaps down behind the detent surface 27, stopped by the lever stop surface 40, and the latching is complete. Synchronously the free end 34 of the lever will have been moved slightly upward in position to be engaged by and to respond to impingement of the trip member 35 thereagainst in due course.

In the simplified illustrative organization of the impulse responsive mechanism for unlatching the tow pin, it is desired to provide a device which is manually settable, and easily changeable in setting, for the selected unloading or tow pin unlatching station. This device functions to unlatch the tow pin at a pre-selected point or station, in terms of the number of floor abutments between the instant starting point and the selected unlatching point. The mechanism includes means advancing the angularly preset ratchet wheel one step toward tripping the unlatching lever for each abutment passed by the impulse-transmitting element to be described.

Essentially, in the illustrative embodiment, the ratchet wheel is so predeterminedly set, that the trip member 35 is just that angular distance from the lever end 34 as to trip the latter in response to a predetermined number of impulses from the floor abutments. The flexibility of the organization with its ability to be instantly adjustable to different series of floor abutment responses, will be evident.

In carrying out this phase of the invention, the frame 15, or the sub frame plate 15' mounted thereon (as it may be found expedient to mount the control mechanism on a separate panel or sheet 15' for ultimate mounting as a unit on the frame 15), as shown in Figs. 4 and 5, mounts a supporting member 52, journalling roller bearings 56, illustratively three in number. A shaft 53 is journalled for rotation in the roller bearings, and mounts a manual control knob 54. A ratchet element 50 is keyed to the shaft 53, and on the rear face mounts the trip element 35. On the front face the ratchet element is peripherally graduated, from zero to the number of floor abutments in the given series, and comprises a dial 57 movable relative to a fixed datum line or indication 55. Preferably a friction device is provided extending between the mounting plate 15' and a face of the ratchet element such as the leaf springs 56' (Fig. 2), to hold the ratchet element in a fixed attitude except under positive actuations, either manual by the knob 54, or mechanical by the stepping pawl to be described. This enables the mechanism to hold a given setting against vibration and the like. Spacing washers 57' and 58 are mounted on the rollers 56 between the rear of the ratchet element 50 and the supporting member 52, and guidingly engage opposite sides of an oscillatable swinging lever 60, journalled on the roller bearings 56, and angularly movable thereon in a limited arc between angularly spaced stops 61 and 62 on the plate 15'.

If it be assumed that angular positioning of the ratchet wheel or element 50 has brought the trip member 35 into tripping engagement with the end 34 of the transverse lever 30, this establishes the zero position of the parts. In this relation therefore the zero graduation of the dial 57 is juxtaposed to the fixed indicator 55. If the ratchet wheel is backed off from the zero setting a given number of increments, measured by the spacing of the respective teeth on the periphery thereof, to be described, as by turning the knob 54, this given number is ascertained by the graduations of the dial 57 in relation to the fixed datum 55. When so set, or variably determined, the graduations on the dial and the teeth on the periphery of the ratchet element between zero and the selected point will determine the number of impulses from the floor abutments that must be received between starting the truck on its towed course and actuating and unlatching the tow pin at an unloading station.

It will be assumed that an ordinal number is attached, or otherwise known to the operator, in a sequence, to each of the successive abutments in a series of abutments 63 on the terminal floor, so that the operator can easily determine the particular unloading station for a given truck on the terminal floor, and can therefore pre-set the ratchet element and dial in accordance with the ordinal of the selected unloading station abutment.

It will be understood that the dial setting mechanism just described is explanatory of the system and that refinements and added functions can be included for various additional purposes, as may be desired.

The ratchet wheel 50 is provided with a peripheral series of teeth 49, and disposed for step-by-step advancement, from wherever set, in one continuous direction, by an advancing and retreating pawl organization, to be described. Beneath the truck organization 13, is the pivoted roller element 80, journalled on a pin 81 mounted in the spaced arms 82—82 of a frame element 83. The frame element is secured to one arm 84 of a lever 85 pivoted on a horizontal pin 86 mounted suitably beneath the truck 13. The forward end of the lever 85, at 87 pivotally connects to a vertical drag link 88. The arrangement is such that between floor abutments 63 the wheel 80 and its mounting frame drops to roll on the floor 11, elevating the link 88. The wheel is in the line of abutments in the towed path of the truck, which latter are usually in aligned series close to but on one side of the main slot 10. The drag link 88 has a suitable lost motion connection 90 with a vertical link 70, so that any incidental upward motion of the drag link exerts no pull on link 70.

The link 70 is pivotally connected to one arm of a bell crank lever 71, pivoted at 72 to the frame member 15'. A cross link 73 is pivoted to the other arm of the bell crank lever 71 at one end, and at the other end is pivoted to the lower end of the pawl or dog 74, pivoted in turn at 75 to the lever 60, and movable with the latter with reciprocations of the cross link 73. A spring 76 engages between a point of the frame 15' and the cross link 73 to retract the pawl and to elevate the link 70 between impulses from the floor abutments, and to clear the pawl 74 from the teeth 49 to permit free rotations of the ratchet wheel when the indicator is being set. It will be observed that an upward impulse on the wheel 80 from an instant traversed floor abutment pulls link 70 downward and thrusts the cross link 73 forwardly against the bias of the spring 76, first tilting the pawl 74 upwardly to engage the tip end 77 thereof behind the juxtaposed tooth 49, and then advancing the tooth and thus the ratchet element one notch or tooth. As noted that advances the trip member 35 one increment toward tripping the lever 30.

The simplicity and advantages of the invention will be obvious, as will the fact that many changes may be made in the device without departing from the principles and spirit of the invention.

It will be understood that the ratchet wheel and pawl organization comprises a counter, and that a motion of the pawl advancing the ratchet wheel one tooth or step and then withdrawing imparts a cyclic motion to the ratchet wheel.

I claim as my invention:

1. A truck for a truck conveyor system, comprising tow pin means, means on the truck guiding the tow pin means for vertical movement between upper and lower limits, means on the truck latching the tow pin means in one of its limits, unlatching means on the truck for unlatching said tow pin means, means for moving said tow pin means vertically when unlatched, movable means on the truck having cyclic motion, complemental means respectively on the truck and extraneous of the truck for imparting successive cyclic motions to the movable means functional in number with the distance the truck travels with the conveyor system, means responsive to cyclic motions of the movable means for actuating said unlatching means, manually settable mechanism to predetermine the number of imparted cyclic motions required to actuate the means responsive for unlatching.

2. A tow truck system comprising a tow truck, a floor, a towing conveyor in general parallelism with said floor for towing said truck on a predetermined path on said floor, a plurality of fixed horizontally spaced substantially identical elements in alignment parallel to said conveyor, each element having a vertically-facing surface area substantially touching a common plane parallel to but spaced from said floor, tow pin means mounted movably on said truck and having respectively a first position and a second position in one of which positions it engages with said conveyor and moves said truck on said predetermined path and in the other of said positions it disengages from said conveyor and towing of the truck by said conveyor is stopped, pulsing means complemental to each of said elements mounted on said truck moving with the truck in a path successively traversing and interacting with each of the traversed elements to produce successive power pulses, counting means on said truck movably responsive to a variable predetermined number of pulses supplied by said pulsing means, means on said truck actuated when the counting means receives the predetermined number of pulses incident to towing of the truck and moving said tow pin means to said other of its positions, said pulsing means coupled to the counter means and transmitting power pulses thereto.

3. A tow truck for a truck conveyor system comprising a wheeled support, a tow pin mounted on the support for vertical movements between up and down positions, means engaging between said support and said tow pin for biasing said tow pin toward one of its positions, means for latching said tow pin in its other position against the bias, a ratchet wheel mounted on said support, a trip on said wheel, a lever on said support in the path of movement of said trip with said wheel, a reciprocating pawl mounted for motion on said support actuating and progressing said ratchet wheel, and means on said support responsive to contact with an abutment means extraneous of said support for reciprocating said pawl.

4. A truck for a truck conveyor system having a conveyor, a floor over which said truck moves, and a substantially aligned series of spaced relatively fixed abutments on said floor and each of substantially the same different level from the surface of said floor, comprising a truck, pulsing means mounted on the truck in position to successively engage and develop a pulse from each of said respective abutments in motion of the truck over said floor in towed relation to said conveyor, a tow pin mounted on said truck for substantially vertical movements between up and down settings in one of which it engages said conveyor, pulse-responsive means on said truck actuated in response to each such pulse, means on said truck controlled by cumulative actuations of said pulse-responsive means effecting motion of said tow pin to disengage same from said conveyor, and means for variably predetermining the number of pulses on said pulse-responsive means to effect such tow pin motion.

5. A truck as in claim 4, in which said conveyor system is in said floor, bias means operative between said truck and said tow pin whereby said tow pin is urged upwardly away from said conveyor, said means controlled comprising latching means on said truck for latching said tow pin downwardly in engagement with said conveyor and comprising a device for unlatching said tow pin.

6. A tow truck for a truck conveyor system comprising a wheeled support, a tow pin mounted on the support for vertical movements between up and down positions, means engaging between said support and said tow pin for biasing said tow pin toward one of its positions, means for latching said tow pin in its other position against the bias, a ratchet wheel mounted on said support having teeth, a trip on said wheel, a lever pivoted on said support engaging and holding said means for latching and disposed in the angular path of motion of said trip with said wheel and arranged for motion releasing said means for latching when tripped by said trip, and means on said support for progressing said wheel angularly in response to motion pulses, and means on said support imparting a motion pulse to said wheel in reaction from engagement with an abutment extraneous of said support.

7. A tow truck for a truck conveyor system having a floor, a main slot in the floor and an aligned series of horizontally spaced abutments mounted on the floor and each of substantially the same level above and relative to said floor, comprising tow pin means mounted on the truck and having an up and a down position in which latter it engages in said main slot, means on said truck for successively engaging and reacting from such respective abutments, and means on said truck movably responsive to a variable predetermined number of such reactions for moving said tow pin out of said main slot to its up position.

8. A truck for a truck conveyor system comprising a tow pin, means guiding said tow pin for movements between an up position and a down position, means for biasing said tow pin toward one of its said positions, a flanged element on said tow pin, a latching lever pivoted on said truck adjacent to said flanged element and movable between positions engaging and disengaging same, a pivoted lever on said truck bearing against said latching lever in its position engaging said flanged element, a pivoted ratchet element rotatably mounted on said truck mounting a trip in position to engage and move said pivoted lever and release said latching lever in the angular motion of the ratchet element, a wheel on said truck having rolling contact with the floor supporting same, and mounted for generally vertical motion in rolling over an abutment, linkage between said wheel and said ratchet element and including a pawl responsive to generally vertical motion of the wheel for progressing said ratchet element in angular motion.

9. A truck as in claim 6, and manual means for adjusting said ratchet wheel to change the starting relation of said trip to said lever to effect a required plurality of pulses from a plurality of abutments before said lever is tripped.

10. A truck as in claim 8, and manual means for changing the instantaneous relation of said trip and said pivoted lever.

11. A truck as in claim 8, said latching lever including first and second spaced arms engageable on opposite sides of said flanged element axially of the tow pin in the engaged position thereof and with said first arm moved out of engagement with said flanged element in disengagement of said latching lever to permit the tow pin to move under its bias, said second arm remaining in alignment axially of said tow pin whereby with manual movement of the tow pin against said bias said latching lever is swung to bring the first arm into engagement with said flanged element to latch said tow pin.

12. A tow truck for a truck conveyor system comprising a tow pin mounted on the truck for substantially vertical motions between up and down positions, means on said truck movable to engage and latch said tow pin in one of its positions, means on said truck for actuating said means movable for unlatching said tow pin comprising ratchet and pawl means including trip means, means on said truck effecting step by step progression of said trip means with the operations of the ratchet and pawl means, complemental means respectively on the truck and extraneous of the truck for effecting successive operations of the ratchet and pawl means as a function of the distance traversed by said truck from a datum, and means for moving said tow pin to the other of its said positions when said means movable is actuated to unlatch said tow pin.

13. A truck as in claim 12, and a dial mounting said trip means associated with said ratchet and pawl means on said truck and graduated in terms of step by step motion of said trip means, a reference device for said dial, and manual means for moving said dial and trip element relative to said reference device to predetermine the number of steps required of said trip element to actuate said means for latching.

14. A truck as in claim 12, in which said means on said truck comprises means reacting by movement from relatively stationary signal means extraneous of the truck, and the latter means comprises an aligned series of similar physical abutments successively traversed by said means reacting.

15. A truck conveyor system and truck combination, comprising a terminal floor having a main slot and a conveyor aligned with and below the slot, a series of substantially identical spaced signal abutment elements mounted on the floor in substantial alignment beside said main slot, each signal abutment element being coordinated in location with a given terminal floor area, a truck for traversing said floor, tow pin means on said truck movable into said main slot for establishing towed relation of said truck to said conveyor, movable means on said truck successively moving in response to each successive signal abutment element encountered in the towed motion of the truck, manually settable means on said truck for predetermining the number of signal abutment elements to be traversed by said truck in attaining a pre-selected given terminal area, and means on said truck actuated by said movable means for moving said tow pin out of towed relation to said conveyor when the movable means encounters the signal abutment element correlated with said pre-selected given terminal area.

References Cited in the file of this patent

UNITED STATES PATENTS

| | | |
|---|---|---|
| 872,253 | Riehl | Nov. 26, 1907 |
| 901,163 | Frederickson | Oct. 13, 1908 |
| 985,056 | Peters | Feb. 21, 1911 |
| 1,047,273 | Morris | Dec. 17, 1912 |
| 1,099,951 | Thurston | June 16, 1914 |
| 2,816,516 | Diehl | Dec. 17, 1957 |

FOREIGN PATENTS

| | | |
|---|---|---|
| 270,653 | Germany | Feb. 20, 1914 |